March 8, 1949.  J. T. CONLEY ET AL  2,463,746
DOLLY FOR HOUSE TRAILERS
Filed Dec. 22, 1945
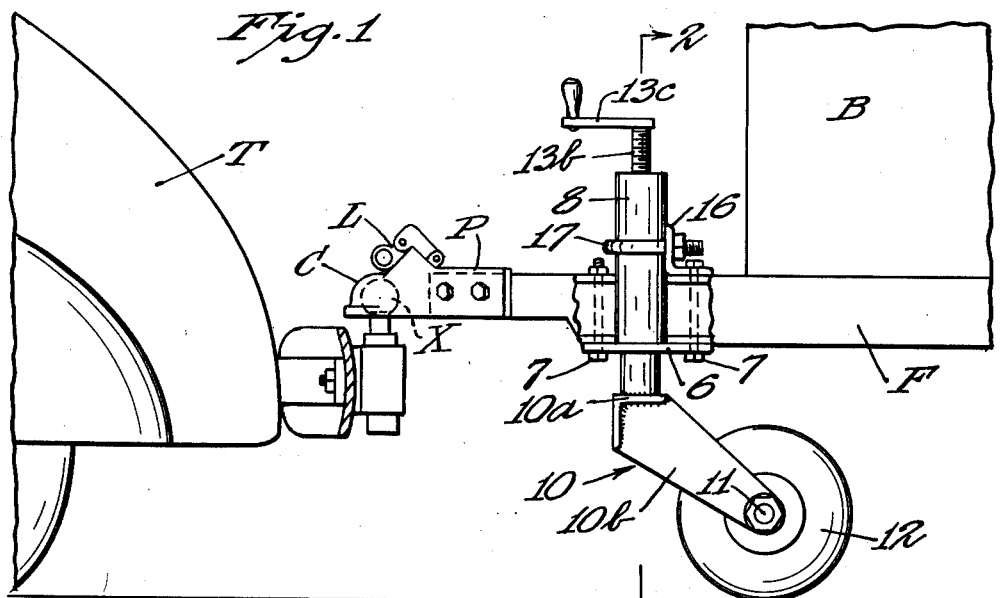
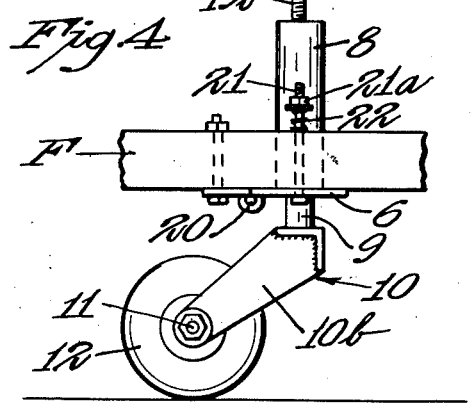
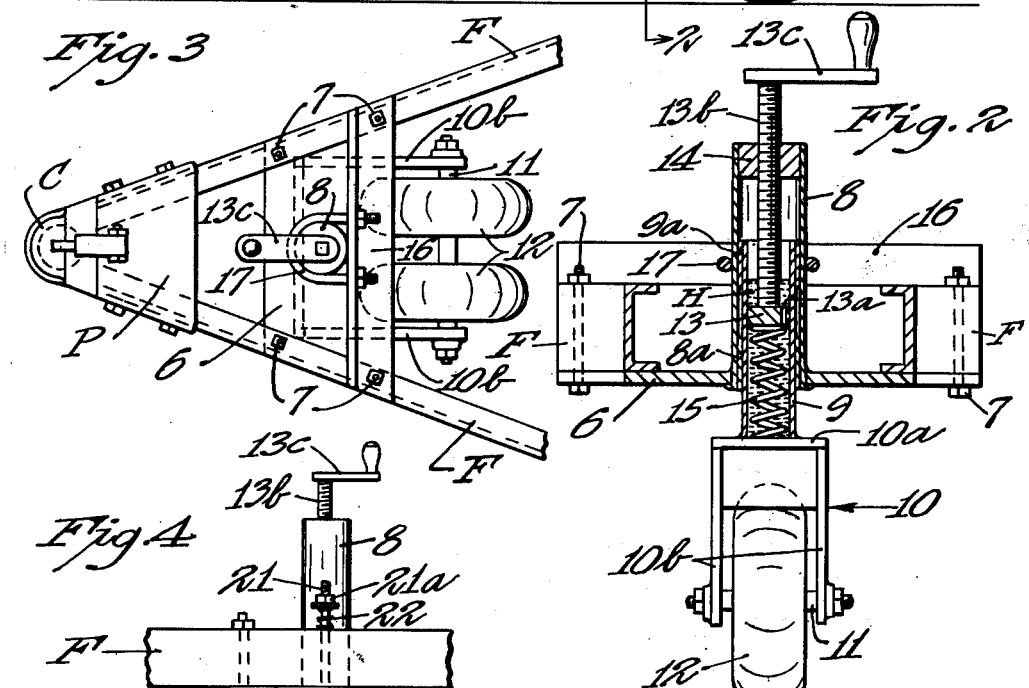
INVENTOR.
Joseph T. Conley
BY Oscar D. True
Williamson & Williamson
ATTORNEYS Patented Mar. 8, 1949

2,463,746

UNITED STATES PATENT OFFICE 2,463,746

DOLLY FOR HOUSE TRAILERS

Joseph T. Conley and Oscar D. True, Minneapolis, Minn.

Application December 22, 1945, Serial No. 636,555

4 Claims. (Cl. 280—33.44)

This invention relates to trailer dollies adapted for wide general use and particularly, adapted to house trailers and the like for partially supporting and stabilizing the front end of trailer vehicles while they are in travel along the highways as well as when they are detached from the tractor vehicle.

It is an object of our invention to provide a very simple, highly efficient trailer dolly adapted to partially support the front end of a trailer vehicle during travel and adapted to fully support the front end of the trailer when the same is uncoupled from the towing vehicle and to render the uncoupled trailer readily movable and maneuverable for sharp swinging or turning in forwardly, rearwardly or substantially gyratory directions, by simple application of human, pushing force.

A further object is the provision of an efficient trailer dolly of the class described wherein adjustment within quite an extended range for stabilization resistance and varying proportional support of the trailer load may be instantly and easily made with the further advantage of elevating and lowering the coupling element at the front end of the draft tongue of the trailer, to facilitate coupling with an automobile or other tractor vehicle.

Another object is the provision of a trailer dolly in the form of an intermediately disposed wheeled truck of the castor type, which constitutes at least a partial front support for the trailer vehicle and relieves the tractor vehicle of additional and excessive loads and strains caused by travel over rough and uneven highways as well as substantially eliminating swaying or sideswipe of the towed vehicle when travelling at considerable speed.

A still further object is the provision of a shock absorbing dolly structure utilizing preferably both spring and hydraulic media for shock absorption and having combined therewith, immediately adjustable, tensioning means for varying the resistance to shock, the proportion of the trailer weight supported and also, the height of the coupling element at the forward end of the draft tongue of the trailer.

These and other objects and advantages of my invention will be more apparent from the following description made in connection with the accompanying drawings wherein like reference characters refer to similar parts throughout the several views and in which:

Fig. 1 is a fragmentary side elevation showing an embodiment of our invention applied to the front end of a conventional type of trailer and showing the trailer coupled to the rear of an automobile or tractor vehicle.

Fig. 2 is a vertical section taken on the line 2—2 of Fig. 1;

Fig. 3 is a top plan view of our improved dolly applied to the draft tongue of a trailer vehicle, in this particular view, a two-wheeled dolly truck being shown whereas in Figs. 1 and 2, a one-wheeled dolly truck is illustrated, utilizing a large, pneumatic tire; and Fig. 4 is a fragmentary, side elevation illustrating a somewhat modified form of the invention applied to the draft tongue of a trailer vehicle.

Referring now to Figs. 1 to 3 inclusive, we illustrate an embodiment of our invention applied to the front end and draft tongue of a conventional type of trailer having a body B supported on a suitable chassis, the heavy horizontal stringer or frame members F of which are illustrated, being of heavy channel iron and converging at the front of the trailer to form a V-shaped draft tongue, the apex of which is reinforced and connected together by a heavy metal plate P of conventional form, having depending flanges bolted to the intermediate webs of channeled frame members F. The usual ball-receiving coupling member C is provided at the front of the draft tongue, rigidly secured as shown, to plate P and having a conventional type of lever-operated locking element L associated therewith whereby an efficient coupling with the upstanding ball X at the rear of a tractor vehicle T, may be effected.

In our structure, a heavy platform plate 6 is provided of trapezoidal configuration to underlie and be bolted to the two frame members F. As shown, elongated bolts 7 are provided, passing through the longitudinal marginal edges of the platform plate 6 and extending through upper and lower horizontal webs of the two channeled frame members F.

Extending through a central, circular aperture, in platform plate 6 and rigidly secured thereto, as by electric welding, we provide an upstanding mounting sleeve 8 within which a stabilizing or swivel sleeve 9 of somewhat smaller diameter is slidably mounted. Stabilizing or swivel sleeve 9 in the form shown, carries an external bearing and stop collar 9a at its upper portion which fits the internal diameter of mounting sleeve 8 with nice working clearance. A second bearing collar 8a is fixed internally within the lower portion of the mounting sleeve 8 surrounding the intermediate portion of the equalizing sleeve 9 and fitting with proper working clearance. Sleeve 9, as shown, is closed at its lower end by sealed, rigid connection with the top plate 10a of an axle fork and said rigid connection of said sleeve may be made by electric welding or integral casting or other fashion. The axle fork 10 has a pair of downwardly and rearwardly extending fork arms 10b, preferably extending at an angle of substantially 45° with the ground line and a heavy, transverse axle 11 is suitably mounted in bossed portions at the lower end of said fork, said axle having a tired wheel 12 rotatably mounted thereon. The wheel 12 is preferably equipped with an oversized pneumatic tire. From the foregoing and by reference to the drawings, it will be seen that the axle fork 10 with its top plate 10a and rigidly fixed and sealed sleeve 9 and with the tired wheel 12, constitutes a castor truck having an upstanding swivel sleeve fixed thereto, with a closed and sealed lower end.

The interior of the stabilizing sleeve 9 constitutes a well wherein the shock absorbing mechanism is housed. Sleeve 9 is obviously mounted for telescopic sliding movement within mounting sleeve 8 and also for free, oscillating movement on a vertical axis. A readily adjustable abutment piston 13 is supported from a fixed plug member 14 which fits the upper end of mounting sleeve 8, being rigidly or if desired, swivelly connected with the lower end of a vertical screw 13b, which threadedly engages the fixed plug 14 and extends upwardly therefrom for some distance, having torque-applying means such as a crank 13c fixed to the upper end thereof. A coil spring 15 is interposed between the bottom of piston 13 and the lower end of the well provided by stabilizing sleeve 9, in the form shown, reacting against the heavy top plate 10a of the axle fork, said spring being placed under considerable tension to yieldably support or partially support, the front end of the trailer.

To further cushion shocks imposed upon the wheels or wheel 12 of the dolly, we prefer to utilize a hydraulic principle in association with the piston 13 and well provided by sleeve 9. To this end, piston 13 is provided with one or more small, vertical ports 13a for passage of a hydraulic fluid H which is supplied to the well before insertion of the plug 14 at the upper end of mounting sleeve 8. The level of the hydraulic fluid is preferably some distance above the high, adjusted position of the piston 13. It will of course, be understood that in lieu of the port or ports 13a in the piston, loose working clearance may be substituted to permit passage of the fluid H during reciprocation of the stabilizing sleeve 9 relative to piston 13.

Additional means may be provided for reinforcing the rigid mounting of the vertical mounting sleeve 8, such as a transverse angle iron 16 which may be bolted to the top of the frame members F just rearwardly of sleeve 8 by the two rearwardly disposed bolts 7 for securing the platform plate 6. The vertical web of angle iron 16, as shown, tangentially abuts the rear of sleeve 8 and a U bolt 17 surrounds the sleeve and is rigidly clamped thereto through the vertical web of angle iron 16.

In use, with the trailer coupled to the tractor vehicle T and with the piston 13 adjusted as desired to relieve the hitch coupling of a desired proportion of the weight of the front end of the trailer, the trailer may be drawn at high speed over a road and the shocks and impacts due to uneveness of the road surface transmitted through the dolly wheel or wheels are taken up and absorbed through the tension coil spring 15 and in the preferred form of our invention, through also the hydraulic equalizing mechanism. The castor action of the wheel during travel reduces and substantially eliminates sidesway of the front end of the trailer, thereby materially reducing the strain upon the towing vehicle and the coupling connections and facilitating steering of the coupled vehicles.

With our structure, any proportion of the weight of the front end of the trailer to be supported by the dolly may be readily effected by quickly turning the piston supporting screw 13b to vary the tension upon supporting spring 15. It is usually desirable to apply some of the weight of the forward end of the trailer to the coupling element X fixed to the rear of the towing vehicle.

When it is desired to uncouple the trailer, no manual lifting of the tongue is required, with our structure. It is only necessary to release the lock mechanism L of the coupling hitch and thereafter, adjust the piston-supporting screw 13b downwardly until the coupling element C fixed to the tongue of the trailer, is raised above the cooperating coupling element X of the towing vehicle. The entire weight of the front end of the trailer is then supported upon our dolly structure and because of the efficient castor action of the wheel or wheels 12, the trailer may be manoeuvered or swung by manual pushing force, thereby enabling the trailer to be wheeled sharply in either forward or rearward directions and positioned as desired in a trailer camp or available supporting area. In recoupling the trailer to the towing vehicle, the tongue of the trailer is properly aligned vertically with the coupling element of the towing vehicle and adjustment screw 13b is then turned to gradually lower coupling element C into engagement with the ball or other element X of the towing vehicle. The cooperating coupling elements are locked and the piston 13 is then adjusted as desired, to support the requisite amount of the weight of the trailer upon the dolly.

When the wheel or wheels of the dolly receives or receive a shock or impact through a bump or unevenness in the highway surface, the same is transmitted to the coil spring 15, cushioning the shock, while permitting relative movement between the stabilizing sleeve 9 and mounting sleeve 8. This relative movement between the two sleeves is cushioned by the hydraulic action of fluid H passing through the restricted passage in or around the circumferential edge of piston 13.

It will be understood that our device is completely operative and quite successful without the use of the hydraulic cushioning media, an air cushion being provided between the lower end of the interior of sleeve 9 and the piston, even though no fluid is supplied. There is however, a marked advantage in the cushioning and absorption of shocks if a fluid media H is utilized within the well provided by the sleeve 9.

In Fig. 4, we illustrate a somewhat different form of the invention, wherein provision is made for the further cushioning of very severe shocks during travel. Here, the structure of the telescoping sleeves 8 and 9 with the shock absorbing structure and medium mounted therein is substantially identical with the corresponding parts of the form previously described. In Fig. 4 however, the platform plate 6, is not rigidly secured to the undersides of the frame members F of the trailer tongue, but at its rear edge, is hinged to the tongue by a heavy hinge mechanism 20 and underlies and supports the tongue, but at its forward edge, is connected therewith for limited freedom of relative movement to the stringer members F of the frame. To such ends as shown, the intermediate side portions of the platform plate 6 are connected to the channel members F by elongated vertical bolts 21 which extend through suitable slide bearings or apertures formed in the horizontal webs of the stringers F, said bolts extending some distance above the upper faces of the frame members and having interposed between adjustment nuts 21a, threaded thereon, coil springs 22.

With our last described structure, in the case of very severe shocks transmitted, to the dolly wheels, not only is resilient displacement provided for in the telescoping sleeve structure, but the entire dolly truck may swing slightly downwardly and rearwardly relative to the tongue of the trailer upon the transverse axis of the heavy hinge means 20.

From the foregoing description, it will be seen that we have provided a highly efficient trailer dolly, adapted to partially or entirely support the front end of a trailer vehicle during travel or when uncoupled and accomplishing many important, improved results, as contrasted with devices of the prior art. It will further be seen that for coupling or uncoupling the trailer from the towing vehicle, and for readily adjusting the tensioning of the cushioning and equalizing mechanism, simple mechanism has been provided which may be very quickly regulated without the application of any tools. It further will be seen that the structure will withstand long, continuous wear; comprises a minimum number of cooperating parts and combines with efficiency, a hydraulic stabilizing principle, if desired.

It will of course, be understood that various changes may be made in the arrangement, details and proportions of the parts, without departing from the scope of our invention, as set forth in the claims of this application.

What we claim is:

1. A trailer dolly comprising a castor truck having an upstanding swivel sleeve fixed to the top thereof, said sleeve providing in conjunction with said truck, a cylindrical cushioning well having a sealed lower end, a mounting sleeve telescoped over said swivel sleeve and having means for attachment to the front of a trailer and providing with said swivel sleeve, bearing surface of substantial area and height to withstand strain and shock in the towing of a trailer, a depending piston mounted coaxially within said swivel sleeve and supported from the upper end of said mounting sleeve, a coil spring interposed between said piston and the lower end of said swivel sleeve, said piston having a liquid passage therein and a hydraulic liquid partially filling said cushioning well.

2. A trailer dolly comprising a castor truck having an upstanding swivel sleeve fixed thereto and providing in conjunction with said truck, a cylindrical cushioning well having a transverse abutment at its lower end, a mounting sleeve telescoped over said swivel sleeve and having means for attachment to the front portion of a trailer, said swivel sleeve providing in conjunction with said mounting sleeve, a cylindrical bearing surface of substantial area and height, a supporting member fixed to the upper end of said mounting sleeve, a screw threadedly supporting and extending through said supporting member coaxially of said sleeves, a piston at the lower end of said screw and positioned within said swivel sleeve, a coil spring interposed between said piston and the lower end of said swivel sleeve and a handle connected to the upper end of said screw to facilitate turning of said screw and vertical adjustment of said piston.

3. A swiveled and shock-cushioning, wheel mounting for trailers and the like comprising an upstanding swivel sleeve open at its upper end and having an abutment at its lower end to form a cushioning well, means connecting said swivel sleeve with and supporting the same from a wheel, a mounting sleeve telescoped over said swivel sleeve and having means for attachment to a vehicle body and extending above the upper end of said swivel sleeve, said sleeves being mounted for relative pivotal and longitudinal movement through the telescoping thereof, to provide cylindrical bearing area of substantial height, a supporting member connected to the top of said mounting sleeve and tapped axially of said sleeves to receive an adjustment screw, an elongated adjustment screw threaded in said supporting member and extending axially of said sleeves into said swivel sleeve, a piston fitting said swivel sleeve at the lower end of said screw and having a fluid passage therethrough, a coil spring interposed between said piston and the lower end of said swivel sleeve and a handle connected to the upper end of said screw to facilitate vertical adjustment of said piston whereby the end of a vehicle upon which my structure is mounted, may be readily raised or lowered for hitch connection and for variance in proportional amount of weight imposed upon a towing vehicle.

4. A swiveled and shock-cushioning, wheel mounting for trailers and the like comprising an upstanding swivel sleeve open at its upper end and having an abutment at its lower end to form a cushioning well, means connecting said swivel sleeve with and supporting the same from a wheel, a mounting sleeve telescoped over said swivel sleeve and having means for attachment to a vehicle body and extending above the upper end of said swivel sleeve, said sleeves being mounted for relative pivotal and longitudinal movement through the telescoping thereof, to provide cylindrical bearing area of substantial height, a supporting member connected to the top of said mounting sleeve for receiving a longitudinally adjustable element, an elongated element mounted in said supporting member and extending axially of said sleeves into said swivel sleeve, a piston positioned in said swivel sleeve and disposed at the lower end of said adjustment element and means for longitudinally adjusting said adjustment element relative to said supporting member to thereby adjust the position of said piston longitudinally of said swivel sleeve, whereby the end of a vehicle upon which my structure is mounted, may be readily raised or lowered for hitch connection and for variance in proportional amount of weight imposed upon a towing vehicle.

JOSEPH T. CONLEY.
OSCAR D. TRUE.

REFERENCES CITED

The following references are of record in the file of this patent:

UNITED STATES PATENTS

| Number | Name | Date |
| --- | --- | --- |
| 2,191,359 | Thornhill | Feb. 20, 1940 |
| 2,205,436 | Richards | June 25, 1940 |
| 2,347,524 | Swan | Apr. 25, 1944 |

Certificate of Correction

Patent No. 2,463,746.                                        March 8, 1949.

JOSEPH T. CONLEY ET AL.

It is hereby certified that error appears in the printed specification of the above numbered patent requiring correction as follows:

Column 5, line 65, claim 2, for the word "supporting" read *supported*;

and that the said Letters Patent should be read with this correction therein that the same may conform to the record of the case in the Patent Office.

Signed and sealed this 30th day of August, A. D. 1949.

[SEAL]

THOMAS F. MURPHY,
*Assistant Commissioner of Patents.*